United States Patent [19]

Van Zon et al.

[11] Patent Number: 4,970,009

[45] Date of Patent: Nov. 13, 1990

[54] MODIFIED VI IMPROVERS

[75] Inventors: Arie Van Zon, Amsterdam, Netherlands; Terence W. Bates, Heswell, United Kingdom

[73] Assignee: Shell Oil Company, Houston, Tex.

[21] Appl. No.: 504,058

[22] Filed: Apr. 2, 1990

Related U.S. Application Data

[63] Continuation of Ser. No. 431,128, Nov. 3, 1989, abandoned.

[30] Foreign Application Priority Data

Nov. 7, 1988 [GB] United Kingdom ................ 8826026

[51] Int. Cl.$^5$ ................ C10M 145/00; C10M 149/00; C10M 151/00
[52] U.S. Cl. .................................... 252/47.5; 525/351; 525/301
[58] Field of Search ................ 252/47.5; 525/351, 301

[56] References Cited

U.S. PATENT DOCUMENTS

| | | | |
|---|---|---|---|
| 3,220,985 | 11/1965 | Breslow | 260/79.3 |
| 4,083,895 | 4/1978 | Nnadi et al. | 252/47.5 |
| 4,292,185 | 9/1981 | Bollinger | 252/47.5 |
| 4,317,738 | 3/1982 | Spence | 252/47.5 |
| 4,517,104 | 5/1985 | Block et al. | 252/47.5 |
| 4,614,765 | 9/1986 | Dean | 525/93 |
| 4,659,491 | 4/1987 | Valkovich et al. | 252/47.5 |
| 4,783,503 | 11/1988 | Gergen et al. | 525/66 |
| 4,797,447 | 1/1989 | Gergen et al. | 525/343 |

*Primary Examiner*—Jacqueline V. Howard

[57] ABSTRACT

Lubricating oil composition comprising a major proportion of a mineral lubricating oil and, as viscosity index improver, a hydrogenated block copolymer or olefin copolymer functionalized by the presence of carboxyl groups attached to the polymer chain by a sulphonamide linkage.

15 Claims, No Drawings

MODIFIED VI IMPROVERS

This is a continuation of application Ser. No. 07/431,128 filed Nov. 3, 1989 now abandoned.

BACKGROUND OF THE INVENTION

This invention relates to luboil viscosity index improvers (VII) having improved viscoelastic properties. In another aspect, the invention relates to mineral lubricating oil compositions containing such VII additives.

A variety of polymeric materials are available to improve the viscosity index of lubricating oils intended for use in internal combustion engines. Such materials include hydrogenated styrene/isoprene diblock copolymers, olefin copolymers, and hydrogenated star (radial) copolymers having a divinylbenzene-derived nucleus and polyolefin arms. Continuing development of engines places increasing demands on the performance characteristics of lubricating oils, leading to continual efforts to achieve property benefits additional to the basic VII effect. One such property is the viscoelastic behavior, and applicants have now discovered that this property can be beneficially modified by the introduction of carboxyl groups onto the polymeric chains.

SUMMARY OF THE INVENTION

The present invention provides a lubricating oil composition which comprises a major proportion of a lubricating oil and, as viscosity index improver, a hydrogenated block copolymer or olefin copolymer functionalized by the presence of carboxyl groups attached to the polymer chain via a sulphonamide linkage ($-SO_2NH-$). In one embodiment, such functionalized polymers bear the carboxyl functional substituent in the structure $RSO_2NH-$, wherein R is a carboxyl-containing organic group, and are prepared by reacting the hydrogenated block copolymer or the olefin copolymer with a sulphonyl azide of formula $RSO_2N_3$ (I), wherein R represents a carboxyl-containing organic group. In another embodiment, R is a carboxyl-aromatic group such as a carboxyphenyl group.

DETAILED DESCRIPTION OF THE INVENTION

The organic radical R in the general formula I may contain substituents other than carboxyl groups, examples of such substituents being halogen atoms, i.e., fluorine, chlorine, bromine or iodine atoms., cyano groups; hydroxyl groups; dialkylamino groups; nitro groups or benzoyl groups. Aromatic groups represented by R may carry, for example, an alkyl a cycloalkyl group, and alkyl groups represented by R may carry, for example, an aromatic or a cycloalkyl group. It is not excluded that R represents a heterocyclic group, for example a thienyl, a furyl or a pyridyl group, or a group obtained by hydrogenation of one of these groups. Specific examples of groups R are 3-carboxyl-4 hydroxyphenyl, 3-carboxy-4 chlorophenyl, 4-(carboxymethoxy)phenyl, 3,4-dicarboxyphenyl, 5-carboxynaphthyl, 2-neopentyl-5-carboxyphenyl and 2-ethyl-5-carboxyphenyl groups.

The block copolymer of the present invention is preferably prepared by heating an admixture of a selectively hydrogenated block copolymer or an olefin copolymer and an azide of the general formula I to a temperature in the range of from 100° C. to 300° C. and particularly from 150° C. to 250° C. The azide of the general formula I may be admixed with the block copolymer in any suitable manner, for example, in a powder mixer, in a melt, in a conventional rubber mill, in an internal mixer, or in an extruder.

In addition to the azide, other ingredients can also be incorporated, for example stabilizers. If desired, the process according to the present invention may be carried out in the presence of a radical scavenger to prevent any degradation of aliphatic carbon-carbon bonds in the block copolymer. Examples of radical scavengers are sterically hindered phenols such as "Ionox 220", a trademark for 4,4'-methylene-bis-2,6-ditertiary butylphenol, and "Ionox 330", a trademark for 1,3,5-trimethyl-2,4,6-tris(3,5-di-tert-butyl-4-hydroxybenzyl)benzene.

The hydrogenated block copolymers modified for incorporation in the luboil compositions of this invention are products which are themselves known as VI improvers. Such copolymers may thus be diblock copolymers of the formula A-B wherein A is a monoalkenylaromatic polymer block, preferably polystyrene, having an average molecular weight between 5,000 and 50,000, and B is an olefin polymer block derived from mono-alpha olefins or conjugated dienes, having an average molecular weight between 10,000 and 1,000,000, wherein hydrogenation has reduced at least 80% of the aliphatic unsaturation but less than 20% of the aromatic unsaturation. Such hydrogenated diblock copolymers are commercially available, for example, SHELLVIS® 50 polymer, and are described in UK Pat. No. 1336746. As detailed therein, the conjugated diene is preferably butadiene, isoprene or a mixture thereof. If the block copolymers contain alpha-monoolefin polymer blocks as block B, preferred monoolefins are ethylene, propylene, and butylene, or mixtures thereof.

The blocks A and B may be homopolymer or copolymer blocks and, in the latter case, the imperative monomers should predominate. A typical polymer of this type prior to hydrogenation has the structure polystyrene/random styrene-butadiene rubber (SBR).

The block copolymers are hydrogenated to reduce their olefinic unsaturation by at least 50% and preferably at least 80% of the original olefinic double bonds, but preferably less than 10% of the aromatic unsaturation. Hydrogenation is preferably carried out in solution utilizing either homogeneous or heterogeneous catalysts. If both aromatic and olefinic double bonds are to be reduced, then relatively stringent hydrogenation conditions may be employed. Preferably, however, the more readily saturated olefinic double bonds are first reduced at relatively mild hydrogenation conditions after which temperature and pressure may be increased so as to effectively cause reduction of aromatic unsaturation, if this is desired. Catalysts, such as cobalt or nickel salts or alkoxides reduced with aluminium alkyl compounds are preferred. Suitable catalysts include nickel acetate, nickel octoate, or nickel acetyl acetonate reduced with aluminum alkyl compounds, such as aluminium triethyl or aluminium tri-isobutyl.

The block copolymers can be used in luboils in proportion of, e.g., 0.75-10, preferably 1-4.5, %w. Other additives, such as detergents, may additionally be used.

Alternatively the block copolymer may be replaced by an olefin copolymer, e.g., prepared from ethylene and propylene. More conveniently purely alternating ethylene-propylene copolymers can be prepared by anionic polymerisation of polyisoprene according to processes described for diblocks above or star polymers below, followed by deactivation of the catalyst and hydrogenation again according to the processes described herein for diblocks and stars. This olefin copolymer is to be considered as an ideal model for olefin copolymers marketed as VI improvers.

Alternatively, the block copolymer may be a hydrogenated star (radial) copolymer such as those comprising a poly(polyalkenyl coupling agent) nucleus (usually divinyl benzene) bearing at least four polymeric arms derived from conjugated dienes and/or monoalkenyl arenes, usually isoprene or butadiene optionally copolymerised with styrene, wherein hydrogenation has reduced at least 50% of the aliphatic unsaturation but less than 20% of the aromatic unsaturation. Such hydrogenated star polymers are commercially available, e.g., SHELLVIS® 200 and 250 polymers, and are described in UK Pat. No. 1575507. As detailed therein, the hydrogenated star polymers can be prepared by the reaction steps of (a) polymerizing one or more conjugated dienes and, optionally, one or more monoalkenyl aromatic compounds, in solution, in the presence of an anionic initiator to form a living polymer, (b) reacting the living polymer with at least 0.5 mole per mole of living polymer of a polyalkenyl coupling agent, having at least two non-conjugated alkenyl groups and no halogen atoms to form a star shaped polymer, and (c) hydrogenating the star-shaped polymer to form a hydrogenated star-shaped polymer.

The living polymers produced in reaction step (a) of the present process are the precursors of the hydrogenated polymer chains which extend outwardly from the poly(poly-alkenyl coupling agent) nucleus.

As is well known, living polymers may be prepared by anionic solution polymerization of conjugated dienes and, optionally, monoalkenyl aromatic compounds in the presence of an alkali metal or an alkali-metal hydrocarbon, e.g., sodium naphthalene, as anionic initiator. The preferred initiator is lithium or a monolithium hydrocarbon. Suitable lithium hydrocarbons include unsaturated compounds such as allyl lithium, methallyl lithium; aromatic compounds such as phenyllithium, the tolyllithiums, the xylyllithiums and the naphthyllithiums and in particular the alkyl lithiums such as methyllithium, ethyllithium, propyllithium, butyllithium, amyllithium, hexyllithium, 2-ethyllithium and n-hexadecyl-lithium. Secondary-butyllithium is the preferred initiator. The initiators may be added to the polymerization mixture in two or more stages optionally together with additional monomer. The living polymers are olefinically and, optionally, aromatically unsaturated.

The living polymers obtained by reaction step (a), which are linear unsaturated living polymers, are prepared from one or more conjugated dienes, e.g., $C_4$ to $C_{12}$ conjugated dienes and, optionally, one or more monoalkenyl aromatic compounds.

Specific examples of suitable conjugated dienes include butadiene (1,3-butadiene); isoprene; 1,3-pentadiene (piperylene); 2,3-dimethyl-1,3-butadiene; 3-butyl-1,3-octadiene, 1-phenyl-1,3-butadiene; 1,3-hexadiene; and 4-ethyl-1,3-hexadiene with butadiene and/or isoprene being preferred. Apart from the one or more conjugated dienes the living polymers may also be partly derived from one or more monoalkenyl aromatic compounds. Preferred monoalkenyl aromatic compounds are the monovinyl aromatic compounds such as styrene, monovinyl naphthalene as well as the alkylated derivatives thereof such as o-, m- and p-methylstyrene, alpha-methylstyrene and tertiarybutylstyrene. Styrene is the preferred monoalkenyl aromatic compound. The living polymers may also be partly derived from small amounts of other monomers such as monovinylpyridines, alkyl esters of acrylic and methacrylic acids (e.g., methyl methacrylate, dodecylmethacrylate, octadecylmethacrylate), vinyl chloride, vinylidene chloride, monovinyl esters of carboxylic acids (e.g., vinyl acetate and vinyl stearate). Preferably, the living polymers are derived entirely from hydrocarbon monomers. If a monoalkenyl aromatic compound is used in the preparation of the living polymers it is preferred that the amount thereof is below 50 %w, based on the weight of diene used.

The living polymers may be living homopolymers, living copolymers, living terpolymers, living tetrapolymers, etc. The living homopolymers may be represented by the formula A-M, wherein M is a carbanionic group, e.g., lithium, and A is polybutadiene or polyisoprene. Living polymers of isoprene are the preferred living homopolymers. The living copolymers may be represented by the formula A-B-M, wherein A-B is a block, random or tapered copolymer such as poly(butadiene/isoprene), poly(butadiene/styrene) or poly (isoprene/styrene). Such formulae, without further restriction, do not place a restriction on the arrangement on the monomers within the living polymers. For example, living poly(isoprene/styrene) copolymers may be living polyisoprene-polystyrene block copolymers, living polystyrenepolyisoprene block copolymers, living poly(isoprene/styrene) random copolymers, living poly(isoprene/styrene) tapered copolymers or living poly (isoprene/styrene/isoprene) block copolymers. As an example of a living terpolymer may be mentioned living poly(butadiene/styrene/isoprene)-terpolymers.

As stated above, the living copolymers may be living block copolymers, living random copolymers or living tapered copolymers. The living block copolymers may be prepared by the step-wise polymerization of the monomers e.g., by polymerizing isoprene to form living polyisoprene followed by the addition of the other monomer, e.g., styrene, to form a living block copolymer having the formula poly-isoprene-polystyrene-M, or styrene may be polymerized first to form living polystyrene followed by addition of isoprene to form a living block copolymer having the formula poly-styrene-polyisoprene-M.

The living random copolymers may be prepared by adding gradually the most reactive monomer to the polymerization reaction mixture, comprising either the less reactive monomer or a mixture of the monomers, in order that the molar ratio of the monomers present in the polymerization mixture is kept at a controlled level; it is also possible to achieve this by adding gradually a mixture of the monomers to be copolymerized to the polymerization mixture. Living random copolymers may also be prepared by carrying out the polymerization in the presence of a so-called randomizer. Randomizers are polar compounds which do not deactivate the catalyst and bring about a tendency to random copolymerization. Suitable randomizers are tertiary amines, such as trimethylamine, triethylamine, dimethylethylamine, tri-n-propyl-amine, tri-n-butylamine, dimethylaniline, pyridine, quinoline, N-ethylpiperidine, N-methylmorpholine., thioethers, such as dimethyl sulphide, diethyl sulphide, di-n-propyl sulphide, di-n-butyl sulphide, methyl ethyl sulphide; and in particular ethers, such as dimethyl ether, methyl ethyl ether, diethyl ether, di-n-propyl ether, di-n-butyl ether, di-octyl ether, di-benzyl ether, di-phenyl ether, anisole, 1,2-dimethyloxyethane, o-dimethoxy benzene, and cyclic ethers such as tetrahydrofuran.

Living tapered copolymers are prepared by polymerizing a mixture of monomers and result from the difference in reactivity between the monomers. For example, if monomer A is more reactive than monomer B then the composition of the copolymer gradually changes from that of nearly pure poly-A to that of nearly pure poly-B. Therefore, in each living copolymer molecule three regions can be discerned, which gradually pass into each other, and which have no sharp boundaries. One of the outer regions consists nearly completely of units derived from monomer A and contains only of small amounts of units derived from monomer B, in the middle region the relative amount of units derived from monomer B greatly increases and the relative amount of units derived from monomer A decreases, while the other outer region consists nearly completely of units derived from monomer B and contains only small units derived from monomer A. Living tapered copolymers of butadiene and isoprene are preferred living tapered polymers.

Since the living polymers produced in reaction step (a) of the above process are the precursors of the hydrogenated polymer chains which extend outwardly from the poly(poly-alkenyl coupling agent) nucleus, it can be seen that the preferred hydrogenated polymer chains are hydrogenated polybutadiene chains, hydrogenated polyisoprene chains, hydrogenated poly(butadiene/isoprene) chains, hydrogenated poly(butadiene/styrene) chains and hydrogenated poly(isoprene/styrene) chains.

The solvents in which the living polymers are formed are inert liquid solvents such as hydrocarbons e.g., aliphatic hydrocarbons, such as pentane, hexane, heptane, octane, 2-ethylhexane, nonane, decane, cyclohexane, methylcyclohexane or aromatic hydrocarbons, e.g., benzene, toluene, ethylbenzene, the xylenes, diethylbenzenes, propylbenzenes. Cyclohexane is preferred. Mixtures of hydrocarbons, e.g., lubricating oils, may also be used.

The temperature at which the polymerization is carried out may vary between wide limits such as from −50° to 150° C., preferably from 20 to 80° C. The reaction is suitably carried out in an inert atmosphere such as nitrogen and may be carried out under pressure, e.g., a pressure of from 0.5 to 10 bars.

The concentration of the initiator used to prepare the living polymer may also vary between wide limits and is determined by the desired molecular weight of the living polymer.

The molecular weight of the living polymers prepared in reaction step (a) may vary between wide limits. Suitable number average molecular weights are from 5,000 to 150,000 with a number average molecular weights of from 15,000 to 100,000 being preferred. Consequently, the number average molecular weight of the hydrogenated polymer chains of the final star-shaped polymer may also vary between these limits.

The living polymers produced in reaction step (a) are then reacted, in reaction step (b), with polyalkenyl coupling agent. Polyalkenyl coupling agents capable of forming star-shaped polymers are well known to those skilled in the art. They are compounds having at least two alkenyl groups, usually attached to the same or different electron-withdrawing groups e.g., an aromatic nucleus. Such compounds have the property that at least two of the alkenyl groups are capable of independent reaction with different living polymers and in this respect are different from conventional conjugated diene polymerizable monomers such as butadiene, isoprene, etc. Pure or technical grade polyalkenyl coupling agents may be used. Such compounds may be aliphatic, aromatic or heterocyclic. Examples of aliphatic compounds include the polyvinyl and polyallyl acetylenes, phosphates and phosphites as well as the dimethacrylates, e.g., ethylene dimethyacrylate. Examples of suitable heterocyclic compounds include divinyl pyridine and divinyl thiophene. The preferred coupling agents are the polyalkenyl aromatic compounds and the most preferred are the polyvinyl aromatic compounds. Examples of such compounds include those aromatic compounds, e.g., benzene, toluene, xylene, anthracene, naphthalene and durene which are substituted by at least two alkenyl groups preferably directly attached thereto. Examples include the polyvinyl benzenes e.g., divinyl, trivinyl and tetravinyl benzenes; divinyl, trivinyl and tetravinyl ortho-, meta- and para-xylenes, divinyl naphthalene, divinyl ethyl benzene, divinyl biphenyl, diisobutenyl benzene, diisopropenyl benzene and diisopropenyl biphenyl. The preferred aromatic compounds are represented by the formula A $(CH=CH_2)_x$, wherein A is an optionally substituted aromatic nucleus and x is an integer of at least 2. Divinyl benzene, in particular meta-divinyl benzene, is the most preferred aromatic compound. Pure or technical grade divinylbenzene (containing various amounts of other monomers e.g. styrene and ethyl styrene) may be used. The coupling agents may be used in admixture with small amounts of added monomers which increase the size of the nucleus, e.g. styrene or alkylated styrene. In this case, the nucleus may be described as a poly(dialkenyl coupling agent/monoalkenyl aromatic compound) nucleus e.g., a poly(divinylbenzene/monoalkenyl aromatic compound) nucleus. From the above, it will be clear that the term divinylbenzene when used to describe the nucleus means either purified or technical grade divinyl benzene.

The polyalkenyl coupling agent should be added to the living polymer after the polymerization of the monomers is substantially complete i.e., the agent should only be added after substantially all of the monomer has been converted to living polymers.

The amount of polyalkenyl coupling agent added may vary between wide limits but at least 0.5 mole is used per mole of unsaturated living polymer. Amounts of from 1 to 15 moles, preferably from 1.5 to 5 moles are preferred. The amount, which may be added in two or more stages, is usually such so as to convert at least 80 or 85 %w of the living polymers into star-shaped polymers.

The reaction step (b) may be carried out in the same solvent as for reaction step (a). A list of suitable solvents is given above. The reaction step (b) temperature may also vary between wide limits e.g., from 0° to 150° C., preferably from 20° C. to 120° C. The reaction may also take place in an inert atmosphere, e.g., nitrogen and under pressure, e.g., a pressure of from 0.5 to 10 bars.

The star-shaped polymers prepared in reaction step (b) are characterized by having a dense center or nucleus of cross-linked poly(polyalkenyl coupling agent) and a number of arms of substantially linear unsaturated polymers extending outwardly therefrom. The number of arms may vary considerably but is usually between 4 and 25, e.g., from 7 to 15. Star-shaped homopolymers may be represented by the formula A-x-(A)$_n$ and star-shaped copolymers may be represented by the formula A-B-x-(B-A)$_n$ wherein n is an integer, usually between 3 and 24 and x is the poly(polyalkenl coupling agent) nucleus.

From the above, it can be seen that x is preferably a poly(polyvinyl aromatic coupling agent) nucleus and more preferably a poly(divinylbenzene) nucleus. As stated above, it is believed that the nuclei are cross-linked.

Such star-shaped polymers, which are still "living", may then be deactivated or "killed," in known manner, by the addition of a compound which reacts with the carbanionic end group. As examples of suitable deactivators may be mentioned compounds with one or more active hydrogen atoms such as water, alcohols (e.g., methanol, ethanol, ispropanol, 2-ethylhexanol) or carboxylic acids (e.g. acetic acid), compounds with one active halogen atom, e.g., a chlorine atom (e.g., benzyl chloride, chloromethane), compounds with one ester group and carbon dioxide. If not deactivated in this way, the living star-shaped polymers will be killed by the hydrogenation step (c).

However, before being killed the living star-shaped polymers may be reacted with further amounts of monomers such as the same or different dienes and/or monoalkenyl aromatic compounds of the types discussed above. The effect of this additional step, apart from increasing the number of polymer chains, is to produce a further living star-shaped polymer having at least two different types of polymer chains. For example, a living star-shaped polymer derived from living polyisoprene may be reacted with further isoprene monomer to produce a further living star-shaped polymer having polyisoprene chains of different number average molecular weights. Alternatively, the living star-shaped polyisoprene homopolymer may be reacted with styrene monomer to produce a further living star-shaped copolymer having both polyisoprene and polystyrene homopolymer chains. Thus, it can be seen that by different polymer chains is meant chains of different molecular weights and/or chains of different structures. These further polymerizations may take place under substantially the same conditions as described for reaction step (a) of the process. The additional chains may be homopolymer, copolymer chains etc., as described above.

The molecular weights of the star-shaped polymer to be hydrogenated in reaction step (c) may vary between wide limits. Suitable molecular weights are from 25,000 to 1,000,000 with molecular weights of from 100,000 to 750,000 being preferred and molecular weights of from 250,000 to 650,000 being particularly preferred. Suitably, the molecular weights are expressed as peak molecular weights, determined by GPC on polystyrene scale.

In step (c), the star-shaped polymers may be hydrogenated by any suitable technique. Suitably at least 50%, preferably at least 70%, more preferably at least 90%, most preferably at least 95% of the olefinic unsaturation is hydrogenated. If the star-shaped polymer is partly derived from a monoalkenyl aromatic compound, then the amount of aromatic unsaturation which is hydrogenated, if any, will depend on the hydrogenation conditions used. However, preferably less than 10%, more preferably less than 5% of such aromatic unsaturation is hydrogenated. If the poly (polyalkenyl coupling agent) nucleus is a poly(polyalkenyl aromatic coupling agent) nucleus, the aromatic unsaturation of the nucleus may or may not be hydrogenated again depending on the hydrogenation conditions used. The molecular weights of the hydrogenated star-shaped polymers correspond to those of the unhydrogenated star-shaped polymers.

The hydrogenation can be carried out in any desired way. A hydrogenation catalyst may be used, e.g., a copper or molybdenum compound. Compounds containing noble metals or noble-metal compounds can be used as hydrogenation catalysts. Preference is given to catalyst containing a non-noble metal or a compound thereof of Group VIII of the Periodic Table i.e., iron, cobalt and, in particular, nickel. As examples, may be mentioned Raney nickel and nickel on kieselguhr. Special preference is given to hydrogenation catalysts which are obtained by causing metal hydrocarbyl compounds to react with organic compounds of any one of Group VIII metals iron, cobalt or nickel, the latter compounds containing at least one organic compound which is attached to the metal atom by means of an oxygen atom, for instance as described in U.K. Pat. specification No. 1,030,306. Preference is given to hydrogenation catalysts obtained by causing an aluminium trialkyl (e.g., aluminium triethyl or aliminium triisobutyl) to react with a nickel salt of an organic acid (e.g. nickel diisopropyl salicylate, nickel naphthenate, nickel 2-ethyl hexanoate, nickel di-tert-butyl benzoate, nickel salts of saturated monocarboxylic acids obtained by reaction of olefins having from 4 to 20 carbon atoms in the molecule with carbon monoxide and water in the presence of acid catalysts) or with nickel eolates or phenolates (e.g. nickel acetonylacetonate, the nickel salt of butylacetophenone).

The hydrogenation of the star-shaped polymer is very suitably conducted in solution in a solvent which is inert during the hydrogenation reaction. Saturated hydrocarbons and mixtures of saturated hydrocarbons are very suitable and it is of advantage to carry out the hydrogenation in the same solvent in which the polymerization has been effected.

The hydrogenated star-shaped polymer may be recovered in solid form from the solvent in which it is hydrogenated by any convenient technique such as by evaporation of the solvent. Alternatively an oil, e.g., a lubricating oil, may be added to the solution and the solvent stripped off from the mixture so formed to produce concentrates.

The functionalized hydrogenated block copolymers may be added to a variety of oils to produce compositions according to the present invention. Examples of oils include fuel oils, e.g., middle distillate fuels, lubricating oils, such as synthetic lubricating oils, e.g., an ester oil, but preferably mineral lubricating oils; crude oils and industrial oils. The concentration of the hydrogenated star-shaped polymers in such oils may vary between wide limits with amounts of between 0.15 and 10%, preferably from 0.1 to 5%, and most preferably from 0.5 to 2.5 %w. The amounts are based on the weight of the composition. It is often convenient to prepare a concentrate of the functionalized copolymer, e.g., in a luboil, which may then be blended with a lubricating oil to form the desired final composition. Such concentrates suitably contain 10–30%w and preferably 10–25% w of functionalized polymer.

Insofar as the oil is a lubricating oil, it may also comprise other additives such as anticorrosion additives, and/or antioxidants and/or a detergent and/or an extreme-pressure additive and/or one or more additional VI improvers and/or pour-point depressants.

The hydrogenated star polymers functionalized by the presence of carboxyl groups are novel products in themselves, and as such form a further aspect of this invention. When prepared by reaction with the sulphonyl azide of formula I above, these products may be defined as being star polymers bearing on the radial arms functional groups of the formula RSO$_2$NH—, wherein R represents a carboxyl-containing organic group; in particular, a carboxy-aromatic group such as a carboxyphenyl group, and the star polymer is as described above.

The invention is further illustrated in the following Examples.

EXAMPLES 1-21

Preparation of Modified Polymers

Two polymer types were modified by introduction of carboxyl groups. The first being SHELLVIS® 50 polymer which is a polystyrene-ethylene/propylene diblock copolymer having a mol. wt. of 90,000. The second being hydrogenated polyisoprene polymer with a mol. wt. of 90,000. Samples of these products were heated at 200–215° C. in a Brabender mixer with varying amounts of 3-azidosulphonylbenzoic acid (ASB) in the presence of "Ionox" 330 as antioxidant. Details of the reactant quantities and the carboxyl content of the product are set out in Table I, the final products having been purified by dissolution in tetrahydrofuran, filtration, precipitation of the carboxylated polymer by addition to ethanol, and in some instances (as noted) converted into the sodium salt by neutralization with sodium hydroxide.

EXAMPLE 22

Determination of Rheological Properties

The modified polymers prepared as described in Examples 1–21 were added to a preblended mixture of ashless dispersant, ZDTP, dispersant "SAP 001" and luboil HVI-60, to give 1.0% w polymer, 2.0% w SAP 001 and 7.7% w of ashless dispersant and ZDTP, in each case based on the final blend.

All oils were clear, bright amber with no deposits except that prepared from Example 9 which was cloudy amber.

Kinematic viscosities at 100° C. were measured with an Ubbelhode viscometer. High-temperature, high-shear viscosities were determined at 150° C. and $10^6$ s$^{-1}$ using a Ravenfield tapered-plug viscometer. Elastic properties were measured at 40° C. and at shear rates in the range $10^5$ s$^{-1}$ to $10^6$ s$^{-1}$ with a Lodge Stressmeter. This instrument determines the first normal stress difference, P$_n$, as a function of shear stress, $\sigma$. The constants A and B in the relation $$\log P_N = A + B \log \sigma \qquad (1)$$

were determined by regression analysis. P$_N$ at a shear rate of $10^6$ s$^{-1}$ was calculated by replacing in Equation (1) by the product of $10^6$ and $\eta$ (this relation follows from the definition of viscosity=$\sigma$/shear rate). The first normal stress difference was assumed to be independent of temperature in the range 40° C. to 150° C. At the time the elastic measurements were made the stressmeter could be operated only up to 60° C. Although measurements made on a variety of (non-ionic) VI improver chemistries showed that first normal stress difference is independent of temperature in the range 20° C. to 60° C., the assumption of temperature indepen-

TABLE I

| Example | Substrate | ASB-intake mol/mol | ASB-intake mmol/g | Neutralization by NaOH | TBN mmol/g | TBN after 2nd purification[a] (mmol/g) | Na mmol/g | S mmol/g | N mmol/g | Number of carboxylate groups/polymer chain[b] mol/mol | Efficiency of ASB-reaction[b] (%) |
|---|---|---|---|---|---|---|---|---|---|---|---|
| 1[d] | SV50 | 0 | 0 | N[f] | | | | | | | |
| 2[e] | SV50 | 0 | 0 | N[g] | 0.002 | | | 0.002 | 0.001 | | |
| 3 | SV50 | 1.7 | 0.019 | Y | 0.017 | | | 0.14 | 0.16 | 1.2 | 73 |
| 4 | SV50 | 2.3 | 0.025 | N | | | | 0.021 | | 1.9 | 84 |
| 5 | SV50 | 4.8 | 0.053 | Y | 0.081 | 0.079[h] | | | 0.038 | 3.4[k] | 72[k] |
| 6 | SV50 | 5.6 | 0.063 | N | | | | 0.055 | | 5.0 | 88 |
| 7 | SV50 | 9.5 | 0.015 | N | | | | 0.083 | | 7.5 | 79 |
| 8 | SV50 | 10.1 | 0.112 | Y | 0.093 | | | 0.082 | 0.066 | 7.4 | 73 |
| 9 | SV50 | 17.8 | 0.198 | Y | 0.513 | 0.213 | 0.470 | 0.157 | 0.109 | 14.1 | 79 |
| 10 | SV50 | 18.1 | 0.201 | N | | | | 0.138 | | 12.4 | 68 |
| 11 | SV50 | 37.0 | 0.411 | N | | | | 0.212 | | 19.1 | 52 |
| 12 | SV50 | 38.3 | 0.426 | Y | 0.852 | 0.377 | 0.772 | 0.192 | 0.193 | 17.3 | 45 |
| 13 | SV50 | 59.9 | 0.666 | Y | 0.592 | | 0.772 | 0.258 | | 23.2 | 39 |
| 14 | SV50 | 62.4 | 0.693 | N | | | | 0.260 | | 23.4[h] | 37 |
| 15[e] | EP | 0 | 0 | N | | | | 0.002 | | | |
| 16 | EP | 1.4 | 0.016 | N | | | | 0.009 | | 0.8 | 54 |
| 17 | EP | 4.9 | 0.055 | N | | | | 0.028 | | 2.5 | 50 |
| 18 | EP | 9.6 | 0.106 | N | | | | 0.040 | | 3.6 | 38 |
| 19 | EP | 17.9 | 0.199 | N | | | | 0.062 | | 5.6 | 31 |
| 20 | EP | 35.4 | 0.393 | N | | | | 0.082 | | 7.4 | 21 |
| 21 | EP | 58.8 | 0.654 | N | | | | 0.100 | | 9.0 | 15 |

[a]2nd purification to remove exess NaOH: dissolve in THF, add equal amount of toluene, filter, wash with toluene/THF 1/1 and evaporate solvent of filtrate
[b]calculated from S-analyses, using Mn of 90,000
[d]subjected to reaction conditions without Ionox 330
[e]subjected to reaction conditions in the presence of Ionox 330
[f]TAN 0.001 mmol/g
[g]TAN = 0.001 mmol/g
[h]too high, considering turbidity of filtrate
[k]calc from N-analyses dence up to 150° C. is questionable, particularly with micelle forming VI improvers.

Two further elastic properties (compliance, J, and relaxation time, $\tau$) were calculated at 150° C. and $10^6$ s$^{-1}$ from $P_n$ and using the following relations:

$$J = P_N/2\sigma^2 \quad (2)$$

$$\tau = \eta J \quad (3)$$

The minimum value, $(h_m)_{min}$, of the minimum oil film thickness was estimated using the following model (see SAE paper 860376) developed from an analysis of experimental $(h_m)_{min}$ in the front main bearing of the 3.8 1 Buick V-6 gasoline engine:

$$(h_m)_{min} = 0.035 + 0.52\eta + 1.16 \quad (4)$$

where $\eta$ and $\tau$ are at 150° C. and $10^6$ s$^{-1}$. The units of $(h_m)_{min}$ are $\mu$m when $\eta$ is in mPa.s and $\tau$ in $\mu$s.

The results of these evaluations are given in Table 2.

TABLE 2

| Polymer Type | Example | $V_k$(100 C) mm$^2$/s | $\eta$ at 150° C. $10^6$s$^{-1}$ mPa.s | Normal Stress at $10^6$s$^{-1}$ KPa | Compliance J $10^{-4}$ Pa$^{-1}$ | Relax. Time $\eta \times J$ $\mu$s | Calc. $(h)_m$ min $\mu$m |
|---|---|---|---|---|---|---|---|
| SHELLVIS ® 50 | SV50 ref. | 14.0 | 2.94 | 1.65 | 0.95 | 0.18 | 1.83 |
| | 3 | 11.7 | 2.95 | 3.71 | 2.13 | 0.63 | 2.24 |
| | 6 | 12.5 | 2.75 | 3.22 | 2.13 | 0.59 | 2.09 |
| | 5 | 12.3 | 2.76 | 4.66 | 3.06 | 0.84 | 2.39 |
| | 7 | 13.0 | 2.66 | 3.79 | 2.68 | 0.71 | 2.18 |
| | 8 | 13.1 | 2.68 | 4.83 | 3.36 | 0.90 | 2.41 |
| | 10 | 13.3 | 2.63 | 4.04 | 2.56 | 0.67 | 2.12 |
| | 9 | 13.9 | 2.64 | 3.54 | 2.90 | 0.77 | 2.24 |
| SHELLVIS ® 50 | 11 | 14.1 | 2.58 | 105 | 0.79 | 0.20 | 1.55 |
| | 12 | 14.5 | 2.54 | 4.45 | 3.45 | 0.88 | 2.32 |
| Hydrogenated Isoprene | 15 | 9.41 | 2.92 | 4.12 | 2.41 | 0.70 | 2.30 |
| | 16 | 9.84 | 3.02 | 4.55 | 2.49 | 0.75 | 2.41 |
| | 17 | 10.67 | 3.11 | 5.91 | 3.06 | 0.95 | 2.68 |
| | 18 | 11.00 | 3.08 | 7.31 | 3.85 | 1.19 | 2.94 |
| | 19 | 12.85 | 3.05 | 9.26 | 4.98 | 1.52 | 3.31 |
| | 20 | 12.79 | 2.93 | 8.50 | 4.95 | 1.45 | 3.17 |
| | 21 | 12.37 | 2.74 | 7.19 | 4.79 | 1.31 | 2.91 |

We claim:

1. A lubricating oil composition comprising a major portion of a mineral lubricating oil; and a polymer selected from the group consisting of a hydrogenated block copolymer and a hydrogenated polyalkadiene wherein the polymer is functionalized by the presence of carboxyl groups attached to the polymer chain by a sulphonamido linkage and the hydrogenated block copolymer comprises at least one block which is predominantly monoalkenyl aromatic and at least one block which is predominantly a polymerized diene.

2. The composition of claim 1 wherein the carboxyl functional substituent has the strucutre RSO$_2$NH—, wherein R is a carboxyl-containing organic group.

3. The composition of claim 2 wherein R is a carboxyaromatic group.

4. The composition of claim 2 wherein R is a carboxyphenyl group.

5. The composition of claim 2 wherein the polymer is functionalized by reaction with a sulphonyl azide of formula RSO$_2$N$_3$, wherein R is selected from the group consisting of carboxyl-containing organic carboxyaromatic and carboxyphenyl.

6. The composition of claim 5 wherein the functionalization reaction between the polymer and the sulphonyl azide is effected by heating the reactants together at a temperature in the range of from 100° C. to 300° C.

7. The composition of claim 6 wherein the functionalization reaction is carried out in the presence of a radical scavenger.

8. The composition of claim 1 wherein the hydrogenated block copolymer is a diblock copolymer of the formula A-B wherein A is a monoalkenylaromatic polymer block having a molecular weight between 5,000 and 50,000, and B is an olefin polymer block derived from mono-alpha olefins or conjugated dienes having an average molecular weight between 10,000 and 1,000,000, wherein hydrogenation has reduced at least 50% of the aliphatic unsaturation but less than 20% of the aromatic unsaturation.

9. The composition of claim 8 wherein block A is polystyrene and block B is derived from a monomer selected from the group consisting of ethylene, propylene, butylene, isoprene, butadiene, and mixtures thereof.

10. The composition of claim 1 wherein the polymer is a hydrogenated polyalkadiene of molecular weight between 10,000 and 1,000,000 wherein hydrogenation has reduced at least 80% of the aliphatic unsaturation but less than 20% of the aromatic unsaturation.

11. The composition of claim 10 wherein the polyalkadiene is polybutadiene or polyisoprene.

12. The composition of claim 1 wherein the polymer is a hydrogenated star polymer comprising a poly(polyalkenyl coupling agent) nucleus bearing at least 4 arms derived from monomers selected from the group consisting of conjugated dienes and mixtures of monoalkenylarenes and conjugated dienes, wherein hydrogenated has reduced at least 80% of the aliphatic unsaturation but less than 20% of the aromatic unsaturation.

13. The composition of claim 12 wherein the star nucleus is derived from divinylbenzene and the polymeric arms are derived from isoprene or butadiene.

14. the composition of claim 13 wherein the polymeric arms are copolymers of styrene and a diene selected from the group consisting of butadiene and isoprene.

15. An oil concentrate comprising a major portion of a mineral lubricating oil; and between 10 and 30% of a polymer selected from the group consisting of a hydrogenated block copolymer, and a hydrogenated polyalkadiene wherein the polymer is functionalized by the presence of carboxyl groups attached to the polymer chain by a sulphonamido linkage and the hydrogenated block copolymer comprises at least one block which is predominantly monoalkenyl aromatic and at least one block which is predominantly a polymerized diene.

* * * * *